(12) United States Patent
Dohmann et al.

(10) Patent No.: US 8,033,154 B2
(45) Date of Patent: Oct. 11, 2011

(54) STEERING RACK MANUFACTURE

(75) Inventors: Juergen Dohmann, Redfern (AU);
Johann Friederich Jaeggi, Kenthurst (AU); Lyle John McLean, Maraylya (AU)

(73) Assignee: Bishop Innovation Limited, North Ryde, New South Wales (AU)

( * ) Notice: Subject to any disclaimer, the term of this patent is extended or adjusted under 35 U.S.C. 154(b) by 0 days.

(21) Appl. No.: 12/956,809

(22) Filed: Nov. 30, 2010

(65) Prior Publication Data

US 2011/0067477 A1 Mar. 24, 2011

Related U.S. Application Data

(63) Continuation of application No. 10/581,283, filed as application No. PCT/AU2004/001693 on Dec. 3, 2004, now Pat. No. 7,886,567.

(30) Foreign Application Priority Data

Dec. 4, 2003 (AU) ................................. 2003906722

(51) Int. Cl.
*B21D 22/00* (2006.01)
*B21K 1/30* (2006.01)
(52) U.S. Cl. ........................ 72/353.2; 72/358; 29/893.34
(58) Field of Classification Search ................. 72/353.2, 72/353.6, 354.2, 354.6, 355.2–355.6, 356–360, 72/370.01; 29/893.34
See application file for complete search history.

(56) References Cited

U.S. PATENT DOCUMENTS

| | | | |
|---|---|---|---|
| 3,802,248 A | 4/1974 | Ross et al. | |
| 4,571,982 A | 2/1986 | Bishop et al. | |
| 4,838,062 A | 6/1989 | Prenn | |
| 5,746,085 A | 5/1998 | Harada et al. | |
| 5,862,701 A | 1/1999 | Bishop et al. | |
| 5,992,205 A | 11/1999 | Bishop | |
| 6,044,684 A | 4/2000 | Ohama et al. | |
| 2002/0044439 A1 | 4/2002 | Shiokawa | |

FOREIGN PATENT DOCUMENTS

| | | |
|---|---|---|
| EP | 3-138042 A | 6/1991 |
| EP | 1 112 791 A2 | 7/2001 |
| GB | 2 088 256 A | 6/1982 |
| GB | 2 108 026 A | 5/1983 |
| JP | 58-13431 A | 1/1983 |
| JP | 58-218339 A | 12/1983 |
| JP | 6-207623 A | 7/1994 |
| JP | 9-141380 A | 6/1997 |
| WO | WO 02/076653 A1 | 10/2002 |

*Primary Examiner* — Teresa Ekiert
(74) *Attorney, Agent, or Firm* — Birch, Stewart, Kolasch & Birch, LLP

(57) ABSTRACT

A die apparatus and method for performing a flashless forging operation to manufacture the toothed portion of a steering rack. The die apparatus includes first and second die members and at least one punch member, each having a forming surface shaped substantially as an obverse of a portion of the toothed portion. At least a portion of the forming surface of the first die member is shaped substantially as the obverse of the teeth of the rack. The first and second die members are moveable towards each other to a closed position, thereby partially forging the toothed portion from a blank placed in the die apparatus, and forming a substantially closed cavity defined by the forming surfaces. The punch member is adapted to move into the cavity once the die members are in the closed position, thereby completing the forging operation.

13 Claims, 10 Drawing Sheets

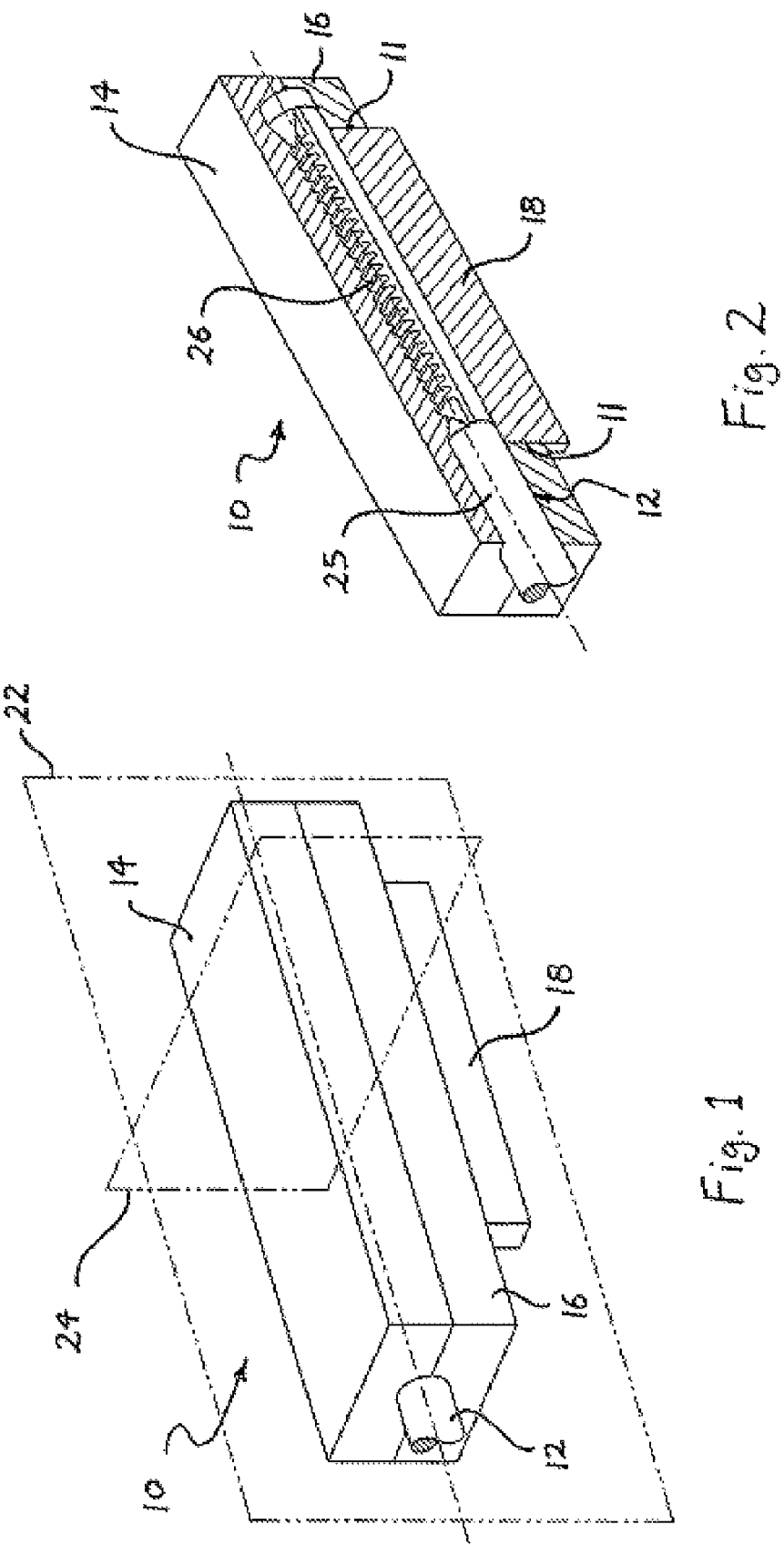

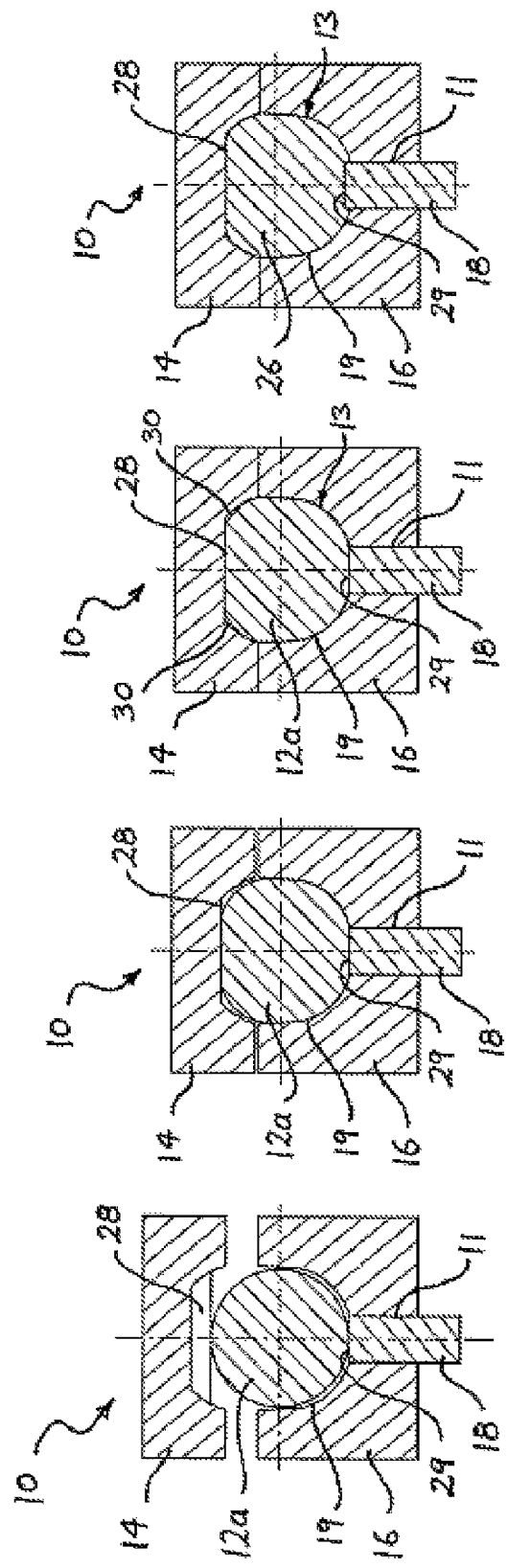

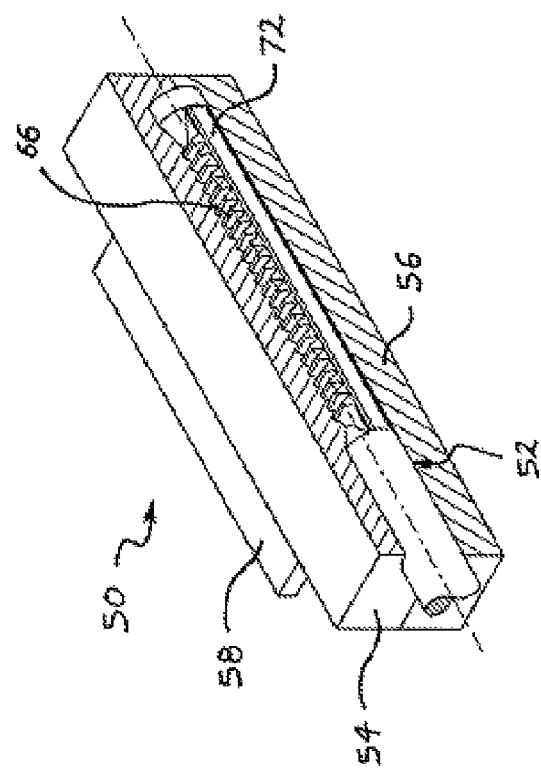
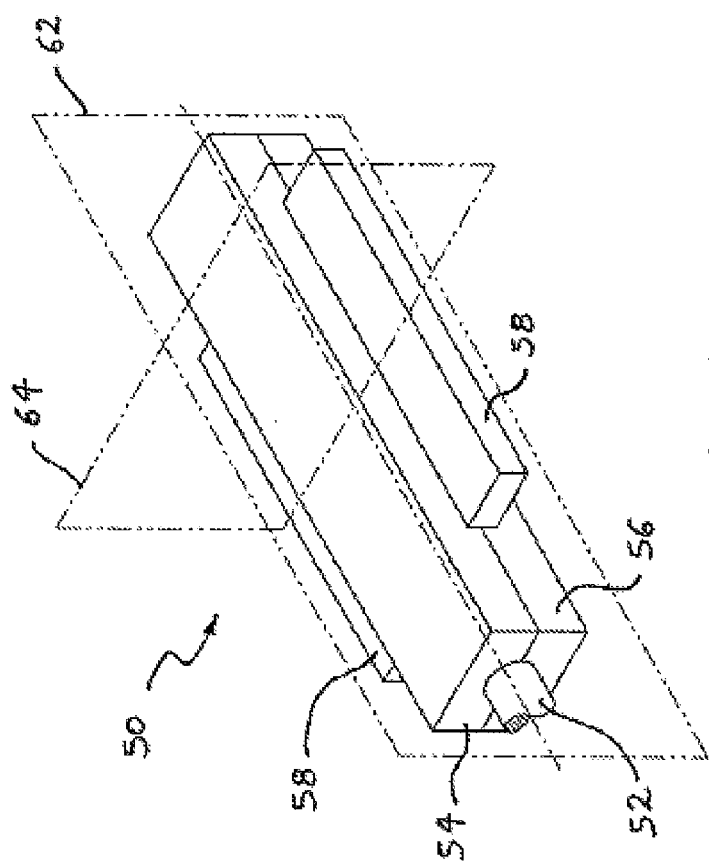

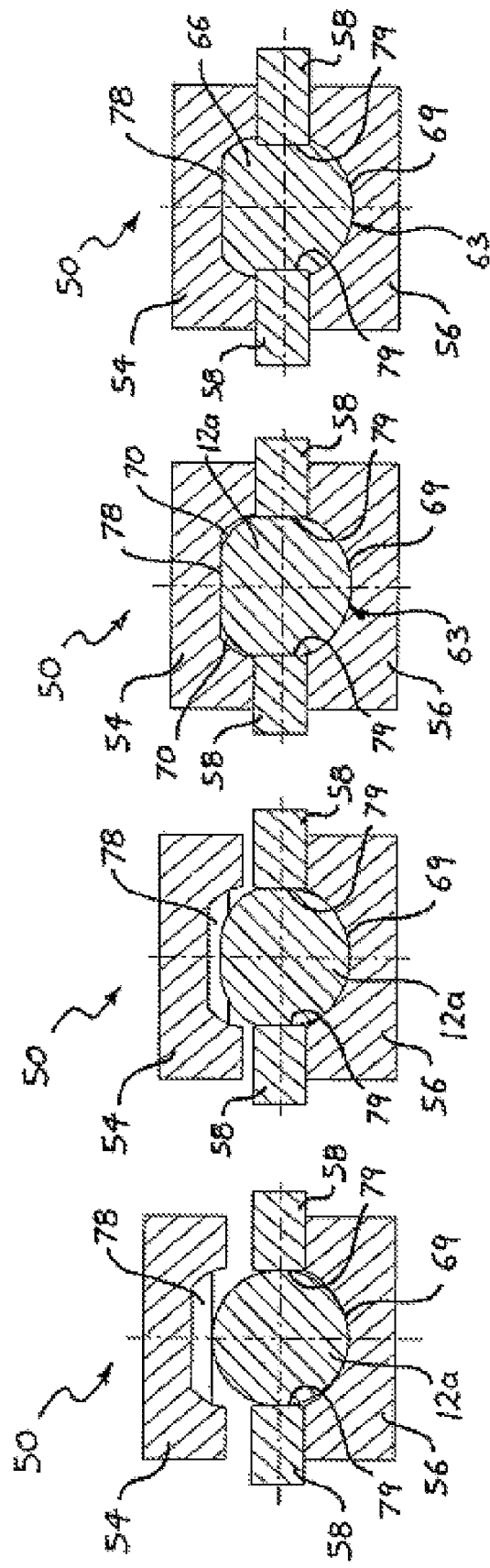

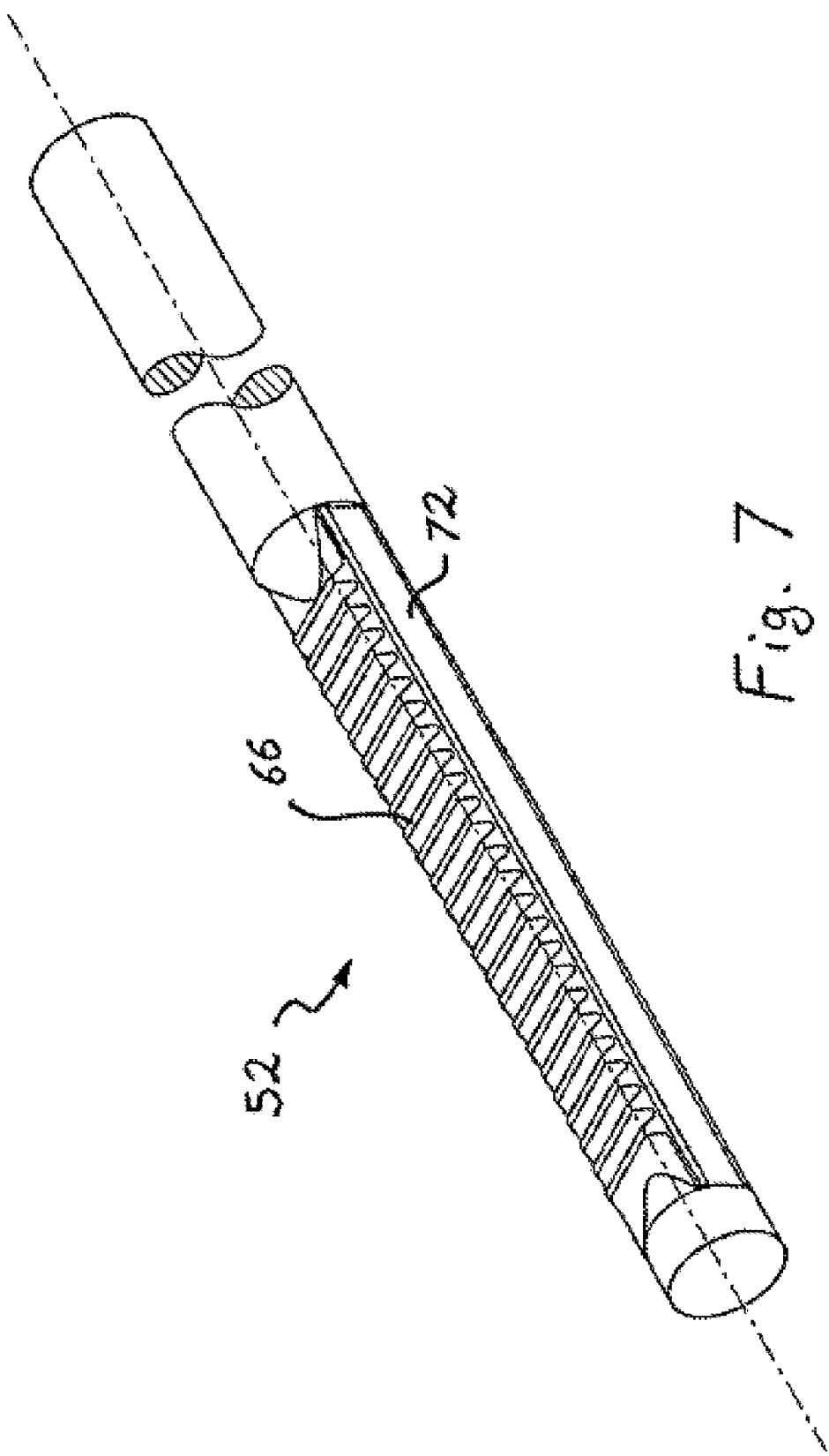

STEERING RACK MANUFACTURE

CROSS-REFERENCE TO RELATED APPLICATION

The present application is a Continuation of U.S. application Ser. No. 10/581,283 filed Jun. 1, 2006 now U.S. Pat. No. 7,886,567, and claims priority under 35 U.S.C. §119 to International Application No. PCT/AU 2004/001693 filed Dec. 3, 2004 and Australian Application No. 2003906722 filed Dec. 4, 2003, the entire contents of which are hereby incorporated by reference.

BACKGROUND OF THE INVENTION

1. Field of the Invention

The present invention relates to a die for forging an automotive steering rack and in particular to a die for flashless forging an automotive steering rack.

2. Description of Background Art

The toothed portions of automotive steering racks are known to be produced by either a machining or a forging process. Typically, the machining process comprises broaching across a solid cylindrical bar resulting in the cross section of the toothed portion having a 'D' shape and hence these racks are commonly referred to as "D-racks". Steering racks having machined teeth can only be economically mass produced with constant pitch teeth. However, racks having forged teeth can be equally mass produced with either constant or variable pitch teeth.

The term "flash" when used with respect to forging refers to the excess material that extends out from the body of a forged component and must typically be removed by a subsequent trimming or machining operation. Flash is a common feature of open die forging, in which case excess material is placed in the die to ensure complete filling of the die cavity. The term "flashless forging" refers to a forging process in which virtually no excess material is allowed to escape from the die cavity. The advantages of flashless forging include the elimination of waste material, elimination of subsequent operations to remove the flash, and greater control over the precision of the forged component. Flashless forging is typically achieved by using a closed forging die.

U.S. Pat. No. 4,571,982 (Bishop) and U.S. Pat. No. 5,862,701 (Bishop et al) disclose a die apparatus for flashless warm forging the toothed portion of a steering rack to net shape from a solid cylindrical bar. "Net shape" means that the forged rack teeth do not require any further machining after forging. This type of die apparatus is limited to forging racks where the cross section of the toothed portion has a 'Y' shape and such racks are commonly referred to as "Y-racks". It is important to note that this type of die apparatus only forms a closed forging cavity at the end of the forging process as can clearly be seen from FIGS. 7, 8 and 9 of U.S. Pat. No. 4,571,982, and the substantially flashless forging results from the unique motion of the tooling elements and the 'Y' shaped cross section of the toothed region, rather than closing the forging cavity prior to the completion of the forging operation. A disadvantage of Y-racks is that they require modification of the steering gear to enable assembly and as such the market has historically preferred D-racks.

Various types of die apparatus have been proposed for forging D-racks from solid bar. However, most of these dies produce flash. FIGS. 3 to 5 of JP 58218339 (Daido Steel Co Ltd) depict a basic open die apparatus comprising only two die halves. The excess material simply escapes the die cavity as flash. This die apparatus provides no means for controlling the cavity pressure and as such the resulting tooth fill is likely to be poor, particularly if the forging operation is performed at warm forging temperatures rather than hot forging. FIG. 5 of JP 58218339 illustrates the process of trimming the flash after forging.

GB 2108026 (Cam Gears Ltd) discloses a die apparatus for forging a D-rack from a solid bar. This is a basic die apparatus having two halves with the addition of flash gutters directed at controlling the formation of the flash and assisting tooth fill. However, material may still escape into these flash gutters prematurely, thereby limiting the admitted hydrostatic pressure which may cause under filling of the die cavity. The flash produced by such a die apparatus is more controlled in shape than that produced by a simple open die but the flash would still typically need to be removed after forging. A more sophisticated die apparatus using a similar principle is disclosed in U.S. Pat. No. 5,992,205 (Bishop), which is directed at shaping the flash gutters to maintain adequate hydrostatic pressure and thereby assist in achieving an adequate tooth fill.

Die apparatus for forging solid D-racks are disclosed in JP 58013431 (Jidosha Kiki Co Ltd) and JP 03138042 (IS Seiki KK et al). Both these dies forge resulting toothed portions that are greater in enclosing diameter than the shank of the finished rack, which is usually the nominal diameter of the bar stock. Such racks have the same assembly problems as Y-racks. Furthermore, both these dies only comprise two halves and as such are unlikely in practice to fully close and fill the teeth without flash forming between the die halves.

FIGS. 8 to 12 of JP 58218339 (Daido Steel Co Ltd) depict a closed die apparatus for forging a steering rack from hollow tube. This die closes before forging starts and therefore the forging process would be substantially flashless. The punch 56 of this die arrangement has a shape that forges the teeth of the rack. Punch 56 moves inwards to perform the forging operation after die halves 58 and 50 close around the hollow tubular blank. The closing of die halves 58 and 50 does not cause any deformation of the blank. The problem with this die arrangement is that the ends of the teeth on punch 56 are open and as such there is no support between the ends of the teeth, which could lead to premature die failure. Furthermore, the ends of the forged teeth are perpendicular to the teeth, rather than sloping at each end, which could interfere with assembly of the rack.

It is an object of the present invention to provide a die apparatus and method for flashless forging of steering racks that ameliorates at least some of the problems of the prior art.

SUMMARY OF INVENTION

In a first aspect, the present invention consists of a die apparatus for performing a flashless forging operation to manufacture the toothed portion of a steering rack, said die apparatus comprising first and second die members and at least one punch member, each having a forming surface shaped substantially as the obverse of a portion of said toothed portion, and at least a portion of the forming surface of said first die member being shaped substantially as the obverse of the teeth of said rack, characterized in that said first and second die members are moveable towards each other to a closed position thereby partially forging said toothed portion from a blank placed in said die apparatus and forming a substantially closed cavity defined by said forming surfaces, said punch member being adapted to move into said cavity, once said die members are in said closed position, thereby completing said forging operation.

Preferably, in one embodiment, said punch member is moveable into said closed cavity through an aperture in one of said die members. Preferably, said aperture is in said second die member and said punch member is moveable with respect to said second die member. Preferably, said punch member is disposed substantially centrally and opposite said first die member, and is moveable towards said first die member. Preferably, said die members abut against each other at said closed position.

Preferably, in another embodiment, said at least one punch member comprises first and second punch members disposed on opposite sides of said cavity, between said first and second die members.

Preferably, said punch member is moveable by means of a mechanism operated by the motion of said die apparatus closing. Preferably, said mechanism comprises at least one wedge member adapted to urge said punch member into said cavity.

Preferably, at least one of said die members is supported by a hydraulic cylinder pressurized by means of said die apparatus closing.

Preferably, the cross section of said toothed portion is substantially D-shaped. Preferably, said blank is a solid bar. Preferably, said blank is cylindrical. Alternatively, said blank is a hollow bar and said die apparatus further comprises a mandrel adapted to be inserted into said hollow bar prior to said forging operation.

Preferably, said die apparatus further comprises at least one axially moveable end punch. Preferably, said end punch is adapted to upset an end of said blank.

In a second aspect, the present invention consists of a method of manufacturing a steering rack comprising performing a forging operation on a blank by means of a die apparatus in accordance with the first aspect of the present invention. Preferably, the teeth of said steering rack are forged to net shape by said forging operation. Preferably, the cross section of the toothed portion of said steering rack is substantially D-shaped.

Preferably, said blank has a first cylindrical portion and a second cylindrical portion smaller in diameter than said first cylindrical portion, said second cylindrical portion being forged to form the toothed portion of said steering rack, the shank of said steering rack comprising said first cylindrical portion. Preferably, said blank further comprises a third cylindrical portion, substantially equal in diameter to said first cylindrical portion, said second cylindrical portion being between said first and third cylindrical portions.

Preferably, blank is heated to a warm forging temperature prior to said forging operation.

In a third aspect, the present invention consists of a die for flashless forging of a steering rack having teeth from a blank, said die comprising at least two die members and at least one punch member, at least one of said die members and said one punch member relatively moveable to converge on said blank when placed in said die, said die members having forming portions substantially the obverse form of said steering rack, said die members defining between them a cavity when said die members converge to a closed position to at least partly forge said steering rack, characterized in that said punch member is adapted to perform an inward movement and thereby urge said partly forged blank to substantially fill said cavity.

Preferably, said rack is finish forged after said punch member has completed said inward movement. Preferably, said punch member enters said cavity via a peripheral aperture located in at least one of said die members. Preferably, said forged rack has a D-shaped cross section.

BRIEF DESCRIPTION OF DRAWINGS

FIG. 1 is a perspective view of a first embodiment of a die in accordance with the present invention.

FIG. 2 is a perspective view of the die shown in FIG. 1 partly sectioned along plane 22.

FIGS. 3a-d are a series of views of the die shown in FIG. 1 sectioned along plane 24 showing the steps of forging a steering rack.

FIG. 4 is a perspective view of a second embodiment of a die in accordance with the present invention.

FIG. 5 is a perspective view of the die shown in FIG. 4 partly sectioned along plane 62.

FIGS. 6a-d are a series of views of the die shown in FIG. 4 sectioned along plane 64 showing the steps of forging a steering rack.

FIG. 7 is a perspective view of a steering rack forged using the die shown in FIG. 4.

DETAILED DESCRIPTION OF THE PREFERRED EMBODIMENTS

Figure 8:
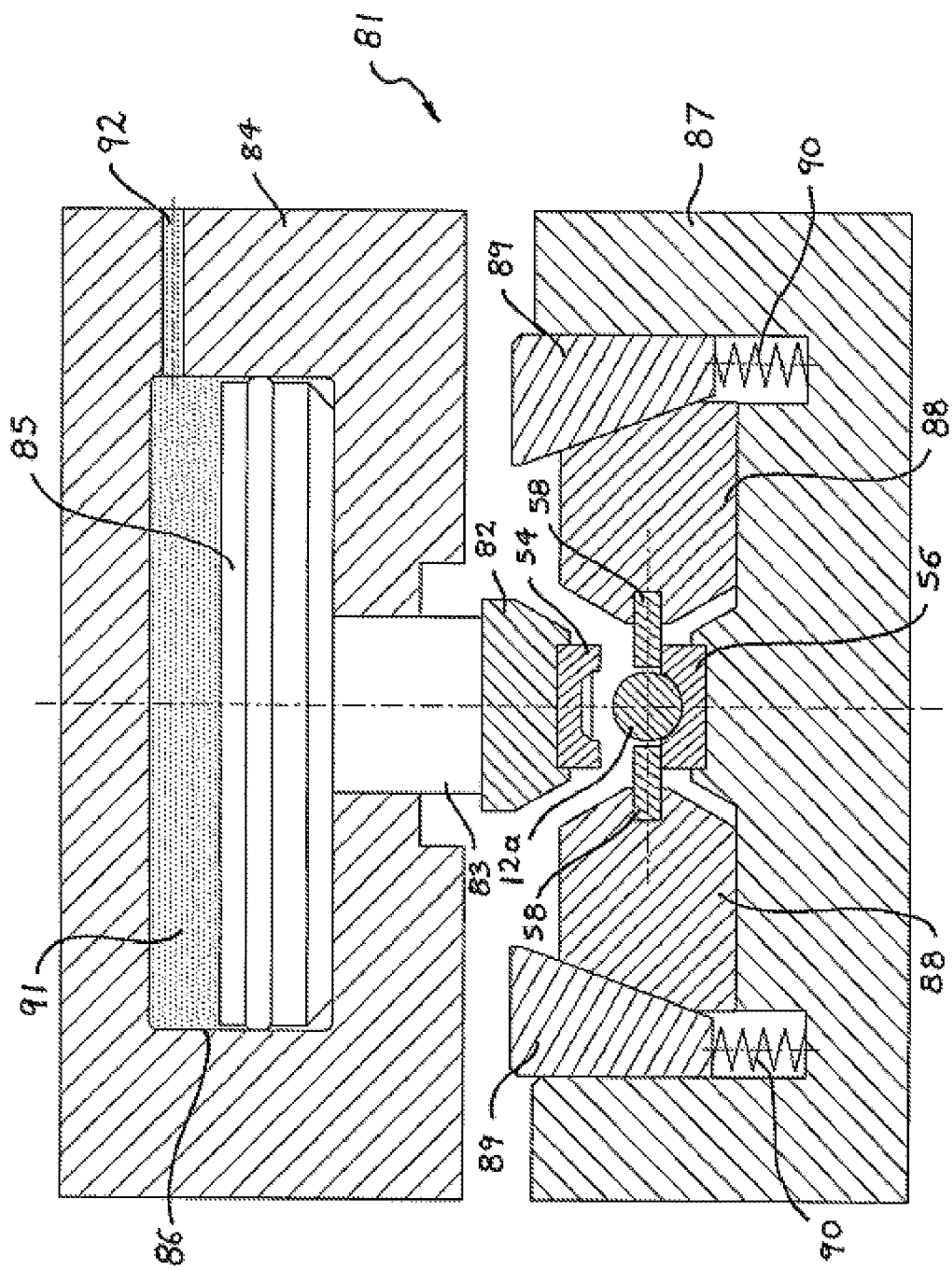
FIGS. 8, 9 and 10 show a schematic arrangement of a complete die apparatus incorporating the die shown in FIG. 4.

FIGS. 1 and 2 depict a first embodiment of a die 10 in accordance with the present invention. Die 10 comprises a first die member 14, a second die member 16 and a punch member 18. Rack 12 is forged utilizing die 10 in combination with a suitable forge press, such as described in U.S. Pat. No. 3,802,248 (Ross et al), in which die members 14 and 16 are attached to the platens of the press. Rack 12 is a D-rack comprising shaft portion 25 and toothed portion 26, which may be of the type which has gear teeth of constant pitch or of the type that has gear teeth with a varying pitch.

FIGS. 1 and 2 show die 10 at the end of the forging process with first die member 14 abutting second die member 16 to form a closed cavity 13. Punch member 18 is moveable with respect to second die member 16 through aperture 11 in second die member 16. Aperture 11 allows punch member 18 to enter cavity 13. Referring to FIG. 3a, first die member 14 has a toothed forming surface 28 with a shape that is the obverse of the shape of the teeth of rack 12. The forming surface 19 of second die member 16 is substantially semi-circular in shape and is the obverse of the portion of toothed portion 26 that slides in a rack pad when rack 12 is assembled into a steering gear. Punch member 18 is disposed centrally about the axis of symmetry of toothed portion 26 and opposite first die member 14. Punch member 18 is moveable towards first die member 14 and has a forming surface 29 that forges a shallow longitudinal indentation on the back of toothed portion 26.

The operation of die 10 is illustrated by FIGS. 3a to d, which are sectional views along plane 24 (FIG. 1) depicting various stages of the process of flashless forging the toothed portion 26 of rack 12. FIG. 3a shows die 10 at the start of the forging process with blank 12a sitting in second die member 16 and first die member 14 moved towards second die member 16 such that toothed forming surface 28 touches blank 12a. Punch member 18 is retracted with respect to second die member 16 such that its forming surface 29 is substantially flush with the semi-circular forming surface 19 of second die member 16.

Blank 12a is in the form of a solid cylindrical bar. For assembly of forged rack 12 into a steering gear, it is desirable that the diameter of a circle enclosing toothed portion 26 is no larger than the diameter of shaft 25 of rack 12. This may be achieved by bar 12a being stepped down such that the portion of it that is forged to become toothed portion 26 is smaller in diameter than the portion that remains as shaft 25 of rack 12.

Bar 12a may be stepped so that it has only two portions, a larger diameter portion that becomes the shaft 25 of the steering rack and a smaller diameter portion that is forged to become the toothed portion 26. Alternatively, bar 12a may have three portions, a smaller diameter portion, which is forged to become the toothed portion 26, between two larger portions that are substantially equal in diameter. One of the larger diameter portions forms the shaft 25 of the rack, and the other forms the opposite tie rod end.

In FIG. 3b, first die member 14 has moved towards second die member 16 partially forging toothed portion 26 from blank 12a. During this step, semi-circular forming surface 19 is substantially filled. In FIG. 3c, first die member 14 has further moved towards second die member 16, further partially forging toothed portion 26, until a closed position is reached in which first die member 14 abuts against second die member 16. This forms a closed cavity 13 defined by forming surfaces 28, 19 and 29. The teeth of toothed portion 26 are not yet fully formed as indicated by the unfilled portions 30 of closed cavity 13. During the steps shown in FIGS. 3b and 3c, punch member 18 has remained stationary with respect to second die member 16. However, in other not shown embodiments, punch member 18 may move with respect to second die member 16 as die members 14 and 16 move towards each other.

FIG. 3d shows the final step of the forging process, whereby punch member 18 moves upwards and into closed cavity 13, creating a high pressure within blank 12a such that it fills toothed forming surface 28. Flash cannot form during this step because cavity 13 is already closed. The teeth of toothed portion 26 are forged to net shape and no finish machining is required. Movement of punch member 18 may be effected by a linkage arrangement connected to the ram of the press, or an alternate actuation means may be utilized. During this step, die members 14 and 16 remain stationary with respect to each other.

Die 10, and other embodiments described herein, may be used for hot, warm or cold forging of steering racks. However, it is preferred that warm forging is used in which a steel blank is heated to a temperature of the order of 500° C. to 900° C.

FIGS. 4 and 5 depict a second embodiment of a die 50 according to the present invention. Die 50 comprises a first die member 54, a second die member 56 and two punch members 58. Similar to the first embodiment, die 50 is used in conjunction with a suitable forge press to forge rack 52, having a toothed portion 66.

Die 50 is similar to die 10, except that die 50 has two punch members 58 instead of single punch member 18. Having two punch members 58 exerting forging load rather than only one is advantageous because it enhances the controllability of the forging process. Punch members 58 are disposed on opposite sides of die 50, between die members 56 and 58. Punch members 58 are adapted to be moveable simultaneously towards the centre of the die, with respect to second die member 56. There is minimal gap between punch members 58 and second die member 56.

Referring to FIG. 6a, first die member 54 has a toothed forming surface 78 with a shape that is the obverse of the shape of the teeth of rack 52. The forming surface 69 of second die member 56 is substantially semi-circular in shape and corresponds to the surface of toothed portion 66 that slides in a rack pad when rack 52 is assembled into a steering gear. Each punch member 58 has a forming surface 79 that forges shallow longitudinal indentations 72 on either side of toothed portion 66, as can be more clearly seen in FIG. 7. It is an advantage to have indentations 72 on either side of the toothed portion, rather than a single indentation opposite the teeth as on rack 12, because it maximizes the contact area between the toothed portion and a rack pad.

The operation of die 50 is illustrated by FIGS. 6a to 6d, which are sectional views along plane 64 (FIG. 4) depicting various stages of the process of flashless forging the toothed portion 66 of rack 52. FIGS. 6a to 6d are similar to FIGS. 3a to 3d illustrating the operation of die 10. FIG. 6a shows die 50 at the start of the forging process with blank 12a sitting in second die member 56 and first die member 54 moved towards second die member 56 such that toothed forming surface 78 touches blank 12a. Punch members 58 are retracted with respect to second die member 56 such that their forming surfaces 79 are substantially flush with the semi-circular forming surface 69 of second die member 56.

In FIG. 6b, first die member 54 has moved towards second die member 56 partially forging toothed portion 66 from blank 12a. During this step, semi-circular forming surface 69 is substantially filled. In FIG. 6c, first die member 54 has further moved towards second die member 56, further partially forging toothed portion 66, until a closed position is reached in which the gaps between first die member 54 and punch members 58 are closed. This forms a closed cavity 63 defined by forming surfaces 78, 69 and 79. The teeth of toothed portion 66 are not yet fully formed as indicated by the unfilled portions 70 of closed cavity 63. During the steps shown in FIGS. 6b and 6c, punch members 58 have remained stationary with respect to second die member 56. However, in other not shown embodiments, punch members 58 may move with respect to second die member 56 as die members 54 and 56 move towards each other.

FIG. 6d shows the final step of the forging process, whereby punch members 58 move simultaneously radially into closed cavity 63, through the apertures formed between die members 54 and 56, creating a high pressure within blank 12a such that it fills toothed forming surface 78. Flash cannot form during this step because cavity 63 is already closed. During this step, die members 54 and 56 remain stationary with respect to each other. The teeth of toothed portion 66 are forged to net shape and no finish machining is required. FIG. 7 shows rack 52 as forged by die 50.

Figure 9:
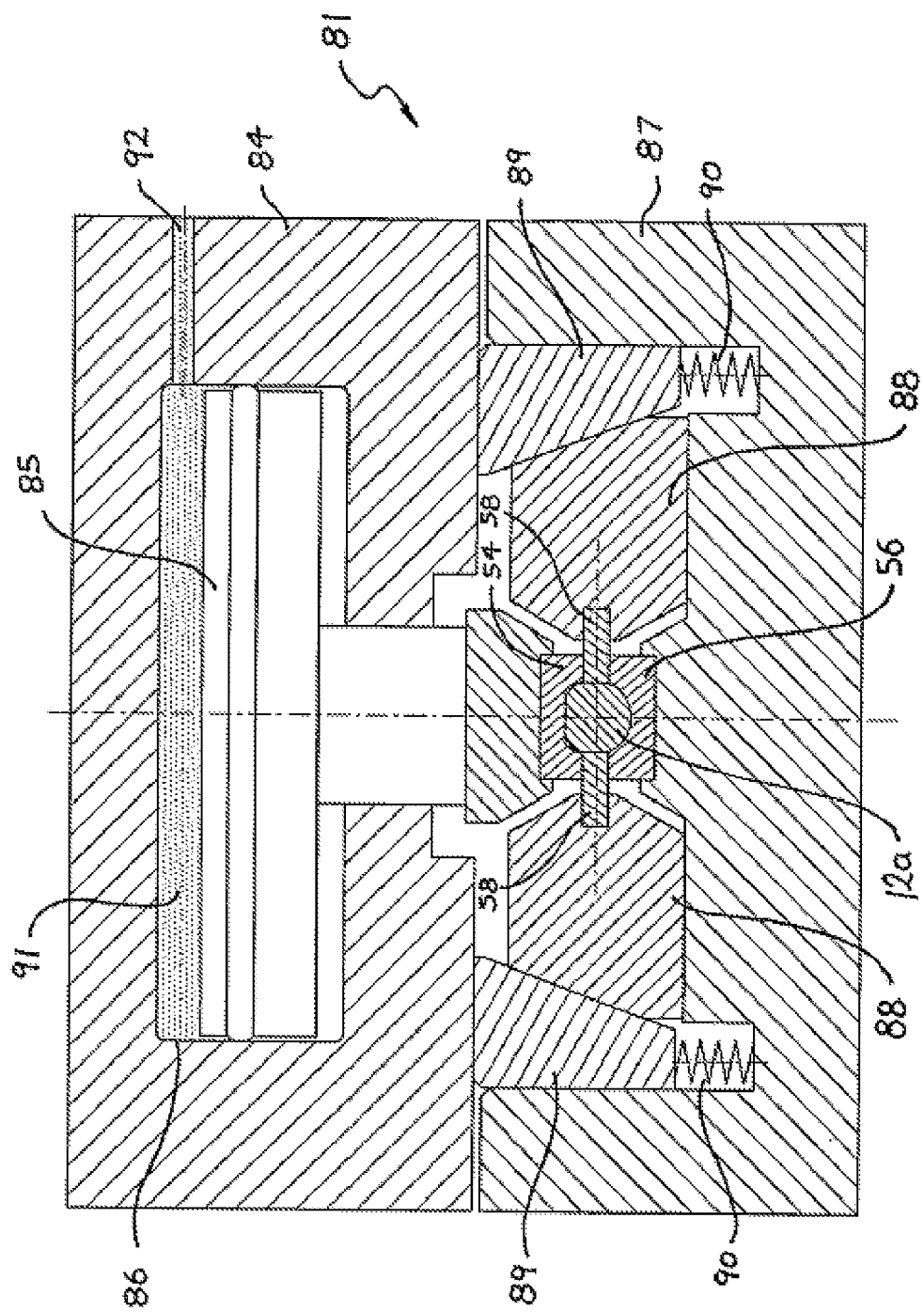
Figure 10:
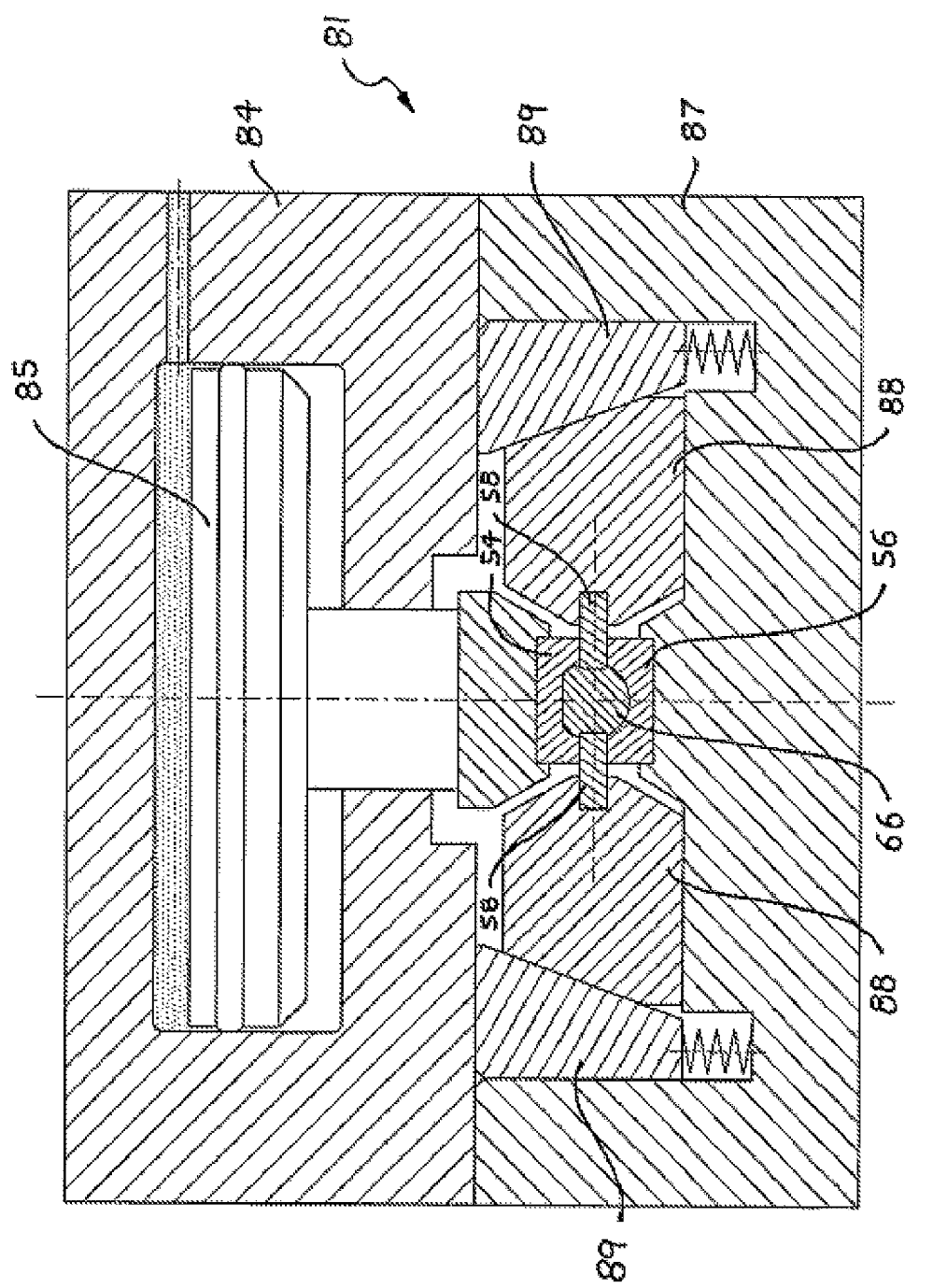

FIGS. 8, 9 and 10 show a schematic arrangement of a complete die apparatus 81 incorporating die 50 shown in FIG. 4. Die 50 comprises first die member 54, second die member 56 and two punch members 58. First die member 54 is attached to carrier 82 that is in turn attached to shaft 83 which is moveable vertically within first bolster 84. Carrier 82 is keyed against rotation by means not shown. Hydraulic piston 85 is attached to shaft 83 and is moveable within a cylinder 86 formed in first bolster 84. Second die member 56 is attached to second bolster 87. Punch members 58 are attached to blocks 88, each moveable horizontally with respect to second bolster 87. Blocks 88 abut against wedge members 89, which are vertically moveable with respect to second bolster 87 and are biased upwards by springs 90.

FIG. 8 shows die apparatus 81 in its open position with a blank 12a loaded into it. Cylinder 86 is filled with hydraulic fluid 91 through port 92. Wedge members 89 are extended upwards by springs 90, which retract punch members 58 to allow sufficient clearance to load blank 12a.

FIG. 9 shows die apparatus 81 in a position during the forging operation corresponding to the position of die 50 shown in FIG. 6c. As first bolster 84 moves downwards, the gap between first die member 54 and punch members 58 closes to form a closed cavity. In this position, first die member 54 is supported by stops not shown so that punch members 58 are not clamped between die members 54 and 56. There is a small clearance between die member 54 and punch members 58 to allow punch members 58 to move freely. After first die member 54 has reached the closed position, it remains in this position for the remainder of the forging operation and further downwards movement of bolster 84 moves piston 85 relative to cylinder 86, which forces hydraulic fluid 91 out through port 92. Port 92 is connected to a relief valve, spool valve, accumulator or other device to control the hydraulic pressure in cylinder 86 as a function of flow through port 92. By this means sufficient pressure can be generated in hydraulic fluid 91 to react against forging loads on first die member 54 and maintain die member 54 in its closed position.

As first bolster 84 moves downwards, it contacts the top surfaces of wedge members 89, thus pushing wedge members downwards with respect to second bolster 87. As wedge members 89 are pushed downwards, they push blocks 88 and punch members 58 into the closed cavity.

FIG. 10 shows die apparatus 81 at the completion of the forging operation corresponding to the position of die 50 shown in FIG. 6d. Between the positions shown in FIG. 9 and FIG. 10, die member 54 remains stationary whilst first bolster 84 continues to move downwards thereby moving punch members 58, by means of wedge members 89, into the closed cavity to complete the forging operation to form toothed portion 66.

Figure 11:
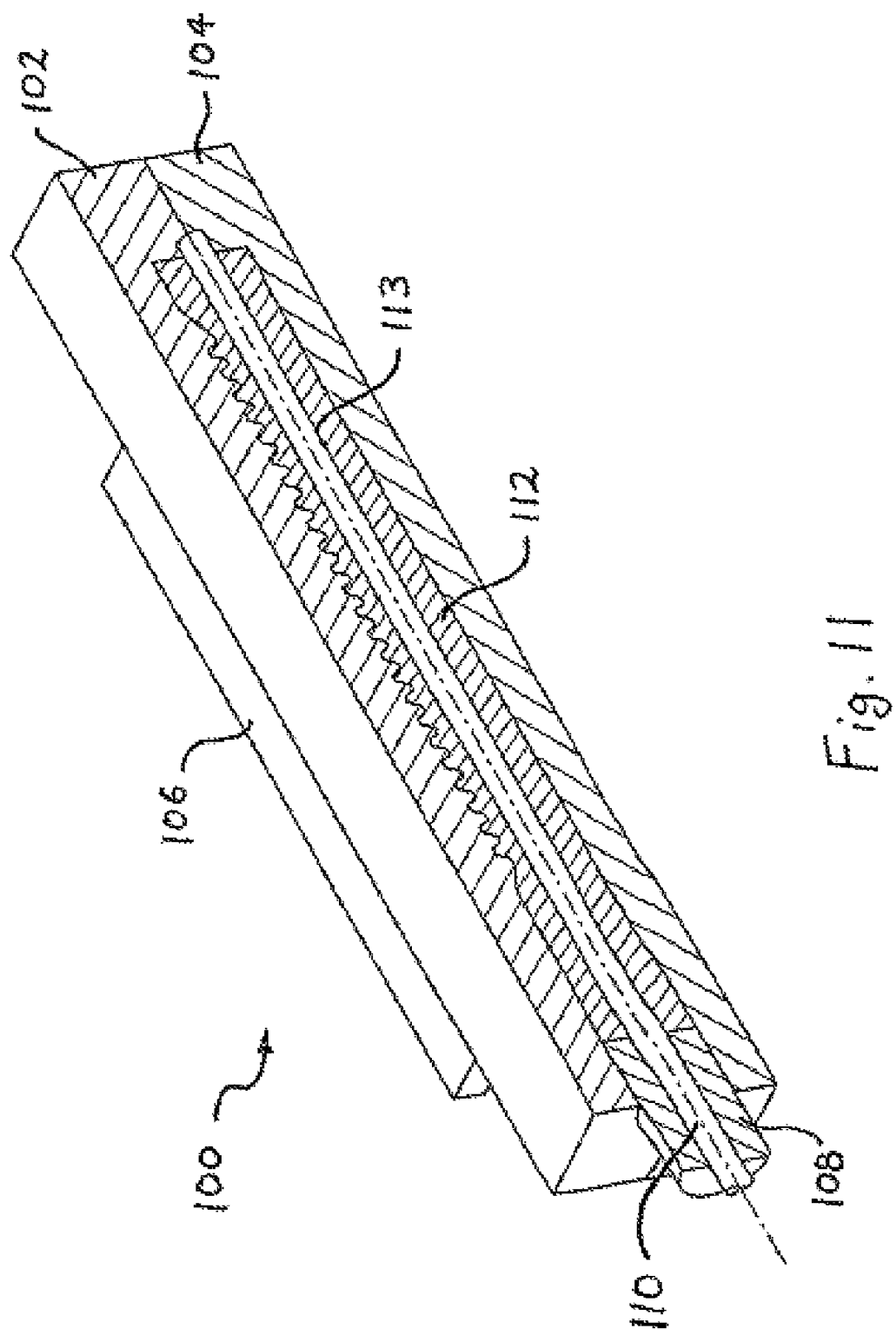
FIG. 11 is a sectional perspective view of a third embodiment of a die in accordance with the present invention.

FIG. 11 depicts a third embodiment of a die 100 according to the present invention. Unlike the racks produced in the first and second embodiments, rack 112 is not a full length rack and will need to be joined to a shaft portion before it is installed into a vehicle steering gear. One method of joining rack toothed portions to shaft portions is described in JP 06207623 (Sekiguchi Sangyo KK).

Die 100 differs from the dies of the previous embodiments in that it includes an axial punch member 108 and mandrel member 110. Axial punch member 108 provides extra control over the forging process as well as a means to control rack 112 final length.

Axial punch 108 is used in combination with radial punch members 106 (only one shown) in the same way to the way that punch members 18, 58 are used in the first and second embodiments, differing only because of the addition of mandrel member 110, which is required for a hollow rack. Mandrel member 110 is inserted into the bore 113 of rack 112 before any forging load is applied, that is, before any relative movement of the die members 102, 104 occurs. Mandrel member 110 is removed after the forging process is complete to leave a hollow rack 112. Hollow racks are desirable in vehicle steering gears because of their light weight and reduced material consumption.

Figure 12:
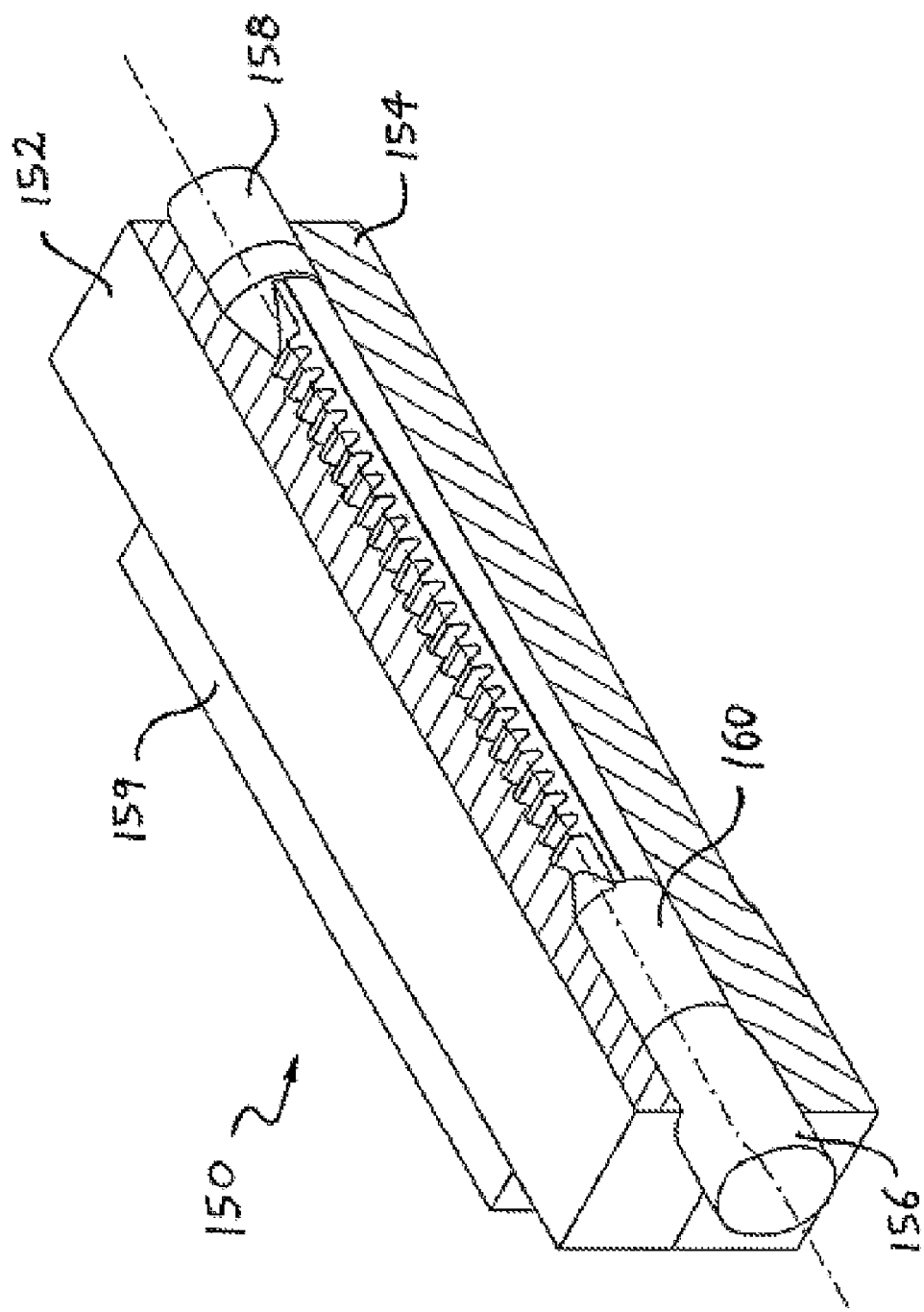
FIG. 12 is a partly sectioned perspective view of a fourth embodiment of a die in accordance the present invention.

FIG. 12 depicts a fourth embodiment of a die 150 according to the present invention. Die 150 comprises first die member 152, second die member 154, and punch members 159 corresponding to members 54, 56 and 58 respectively of die 50. Die 150 differs from die 50 of the second embodiment of the invention in that it further includes first axial end punch 156 and second axial end punch 158. Die 150 forges rack 160, which like rack 112 is a short rack that must be attached to a shaft member to make a complete steering rack. Axial end punches 156 and 158 are moveable in the direction of the longitudinal axis of rack 160. Axial end punches 156 and 158 may either move simultaneously with die members 152 and 154, or may start moving after die members 152 and 154 have moved into a closed position. Axial end punches 156 and 158 move axially into the die to upset the ends of a blank 12a being forged, thus increasing the diameter of the ends of forged rack 160.

It should be understood that the forged racks depicted in the above embodiments are shown with their features, such as their teeth and punch member mating faces, as solid lines suggesting that the die cavity would be entirely filled. In practice this degree of fill would neither be achievable nor desirable in a mass production. That is, a commercially forged rack would desirably show some degree of underfill, being apparent by rounded features.

It should also be understood that for reasons of clarity, various supports, journals, bearings and control units have been omitted from the figures.

Although the present invention has been herein shown and described in four embodiments, it is recognized that departures from, and combinations of these embodiments may be made without departing from the scope of the invention. Also, the present invention is primarily intended to be used to forge steering racks made from steel but may alternatively be used with other forgeable materials.

The term "comprising" as used herein is used in the inclusive sense of "including" or "having" and not in the exclusive sense of "consisting only of".

What is claimed is:

1. A die apparatus for performing a flashless forging operation to manufacture the toothed portion of a steering rack, said toothed portion comprising teeth, said die apparatus comprising:
   first and second die members and a punch member, each having a forming surface shaped substantially as an obverse of an exterior portion of said toothed portion, and
   at least a portion of the forming surface of said first die member being shaped substantially as the obverse of said teeth,
   wherein said first and second die members are moveable towards each other to a closed position thereby partially forging said toothed portion from a blank placed in said die apparatus and forming a substantially closed cavity defined by said forming surfaces,
   said punch member being disposed opposite said first die member, and said punch member being movable towards said first die member into said cavity, once said die members are in said closed position, thereby completing said forging operation.

2. The die apparatus as claimed in claim 1, wherein said punch member is moveable with respect to said second die member.

3. The die apparatus as claimed in claim 1,
   wherein said cavity is closed, and said punch member is moveable into said closed cavity through an aperture in said second die member.

4. The die apparatus as claimed in claim 1, wherein said die members abut against each other at said closed position.

5. The die apparatus as claimed in claim 1, wherein said second die member has a forming surface that is substantially semi-circular in shape.

6. The die apparatus as claimed in claim 1, wherein said punch member has a forming surface that forges a longitudinal indent on an opposite side of said toothed portion opposite to said teeth.

7. The die apparatus as claimed in claim 1, wherein at least one of said die members is supported by a hydraulic cylinder pressurized by means of said die apparatus closing.

8. The die apparatus as claimed in claim 1, wherein a cross section of said toothed portion is substantially D-shaped.

9. The die apparatus as claimed in claim 1, wherein said blank is a solid bar.

10. The die apparatus as claimed in claim 1, wherein said blank is cylindrical.

11. The die apparatus as claimed in claim 1, wherein said blank is a hollow bar and said die apparatus further comprises a mandrel adapted to be inserted into said hollow bar prior to said forging operation.

12. The die apparatus as claimed in claim 1, wherein said die apparatus further comprises at least one axially moveable end punch.

13. The die apparatus as claimed in claim 12, wherein said end punch is adapted to upset an end of said blank.

* * * * *